US011327878B2

(12) United States Patent
Raghupatruni et al.

(10) Patent No.: US 11,327,878 B2
(45) Date of Patent: May 10, 2022

(54) METHOD FOR RATING A SOFTWARE COMPONENT OF AN SIL ENVIRONMENT

(71) Applicant: Robert Bosch GmbH, Stuttgart (DE)

(72) Inventors: Indrasen Raghupatruni, Hemmingen (DE); Thomas Huber, Beilstein (DE); Antonia Reiter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/887,281

(22) Filed: May 29, 2020

(65) Prior Publication Data

US 2021/0056014 A1 Feb. 25, 2021

(30) Foreign Application Priority Data

Aug. 22, 2019 (DE) .......................... 102019212617.0

(51) Int. Cl.
*G06F 11/36* (2006.01)
*G06F 11/22* (2006.01)
*B60W 50/04* (2006.01)
*G06F 11/34* (2006.01)
*B60W 50/00* (2006.01)

(52) U.S. Cl.
CPC ......... *G06F 11/3688* (2013.01); *B60W 50/04* (2013.01); *G06F 11/2273* (2013.01); *G06F 11/3457* (2013.01); *G06F 11/3692* (2013.01); *B60W 2050/0075* (2013.01); *B60W 2556/55* (2020.02)

(58) Field of Classification Search
CPC ............. G06F 11/2273; G06F 11/3457; G06F 11/3688; G06F 11/3692; B60W 50/04; B60W 2050/0079
See application file for complete search history.

(56) References Cited

U.S. PATENT DOCUMENTS

2011/0288841 A1* 11/2011 Larsson ................. G05B 17/02
703/8
2017/0361856 A1* 12/2017 Fischer ............... B61L 27/0055
(Continued)

OTHER PUBLICATIONS

Sebastian Wagner et al., "Towards Cross-Verification and Use of Simulation in the Assessment of Automated Driving," 2019 [retrieved on Sep. 28, 2021], 2019 IEEE Intelligent Vehicles Symposium (IV), pp. 1589-1596, downloaded from <url>:https://ieeexplore.ieee.org/. (Year: 2019).*

(Continued)

*Primary Examiner* — S. Sough
*Assistant Examiner* — Stephen D Berman
(74) *Attorney, Agent, or Firm* — Norton Rose Fulbright US LLP; Gerard Messina

(57) ABSTRACT

A method for rating a software component of a software-in-the-loop (SiL) environment, a target hardware including at least one target hardware component being simulated by an SiL environment including at least one corresponding software component, both the target hardware and the SiL environment being subjected to a test situation, while the target hardware and the SiL environment are being subjected to the test situation, output data being generated in each case by both the target hardware and the SiL environment and the output data of the target hardware being compared to the outputs of the SiL environment, the software component being rated on the basis of the comparison.

9 Claims, 3 Drawing Sheets

(56) References Cited

U.S. PATENT DOCUMENTS

2019/0011905 A1* 1/2019 Knauder ............ G05B 19/0426
2019/0325672 A1* 10/2019 Stefan ..................... G06F 30/15

OTHER PUBLICATIONS

Marius Muresan et al., "Software in the Loop environment reliability for testing embedded code," 2012 [retrieved on Sep. 28, 2021], IEEE 18th International Symposium for Design and Technology in Electronic Packaging, pp. 325-328, downloaded from <url>:https://ieeexplore.ieee.org/. (Year: 2012).*

IEEE, "2019 IEEE Intelligent Vehicles Symposium (IV)", 2019 [retrieved on Sep. 28, 2021], pp. 1-28, downloaded from <url>:https://its.papercept.net/conferences/conferences/IV2019/program/IV2019_ContentListWeb_3.html. (Year: 2019).*

Andrei Dorobantu et al., "Validating Uncertain Aircraft Simulation Models Using Flight Test Data," 2013 [retrieved on Jan. 11, 2022], Guidance, Navigation, and Control and Co-located Conferences, pp. 1-8, downloaded from <url>https://arc.aiaa.org/doi/pdf/10.2514/6.2013-4984. (Year: 2013).*

* cited by examiner

METHOD FOR RATING A SOFTWARE COMPONENT OF AN SIL ENVIRONMENT

CROSS REFERENCE

The present application claims the benefit under 35 U.S.C. 119 of German Patent Application No. DE 102019212617.0 filed on Aug. 22, 2019, which is expressly incorporated herein by reference in its entirety.

FIELD

The present invention relates to a method for rating a software component of a software-in-the-loop environment and a processing unit and a computer program for carrying out this method.

BACKGROUND INFORMATION

Software-in-the-loop (SiL hereafter) simulations represent an option for testing software in development for complex applications, which is to be executed in its later regular operation in special hardware, even before this target hardware is available. For example, the software to be tested may be control software for machines, devices, etc.

In the course of such a software-in-the-loop (SiL) simulation, the software to be tested is executed in a suitable processing unit and integrated into a simulation of the technical system or the environment in which the software is to be used in its later regular operation. It is to be ensured in this case that the simulation of the technical system is sufficiently good, so that the results are preferably realistic.

SUMMARY

According to the present invention, a method for rating a software component of an SiL environment and a processing unit and a computer program for carrying out this method are provided. Advantageous embodiments of the present invention are described herein.

The present invention makes use of the measure of comparing output data generated both by the target hardware and by the SiL environment to rate a software component of an SiL environment, while the target hardware and the SiL environment are or will be subjected to the same test situation, i.e., online or at the runtime, respectively. A subsequent or off-line evaluation is not necessary. For example, such output data may be measured values, sensor values, activation values, etc., which are generated in the course of the operation of the SiL environment and the target hardware.

The software component is used to simulate a target hardware component. Such target hardware components may be, for example, integrated circuits (IC, ASIC, microprocessor, microcontroller, etc.), sensors, and actuators (for example, micro-electromechanical systems, MEMS). It may be established in particular by the rating how accurately or how well the software component corresponds to the target hardware component or how accurate the simulation is. If, for example, the output data correspond within the scope of a predefined tolerance threshold, the software component may be rated, for example, as error-free and suitable for use in SiL environments. However, if the output data deviate from one another by more than the predefined tolerance threshold, this indicates in particular that the software component is still flawed and is not yet suitable for use in SiL environments.

If a sufficiently good or accurate simulation is established, the software component may be used for any desired SiL environments.

The present invention is suitable for various software components to be tested, in particular for carrying out safety-critical vehicle functions. For example, the software component may be provided for functions from the field of autonomous or highly autonomous driving (highly automated driving, HAD), for a vehicle motion control (VMC), for driver assistance systems (advanced driver assistance system, ADAS) such as an adaptive cruise control (ACC), etc. In such a field, software components qualitatively rated good are particularly advantageously usable for enhancing the safety or for use within the scope of a release argument.

Within the scope of the present invention, an evaluation unit may be used in particular which has a data-transfer connection to both the target hardware and to the SiL environment and receives the output data therefrom. The SiL environment may be entirely or partially implemented in the evaluation unit and/or a separate simulation processing unit. The evaluation unit is advantageously designed as a real-time capable processing unit. Real-time capable means that certain processes, for example, processing operations or tasks or a data transfer, are guaranteed to be carried out within a predetermined time.

The target hardware component is preferably located in the vehicle (test vehicle hereafter). The test vehicle is then advantageously actually operated during the evaluation, but not in the field or the real world, but rather particularly advantageously in a predefined test environment, for example, on a so-called real driving test stand or a suitable open area (for example, a test site not accessible to the public). Such a test environment may advantageously be predefined both in hardware and in software. For example, the test vehicle may be operated in a test stand or simulator, with the aid of which a trip of the test vehicle on real roads may be simulated as a test situation. Furthermore, the field or such roads may be simulated in the form of software, for example, in that corresponding test situation vehicle network signals are fed into a vehicle data network of the test vehicle. These test situation vehicle network signals are in particular sensor signals, in particular surroundings sensor signals, for example, camera signals, radar sensor signals, GPS/GNSS signals, etc. Such implementations are also referred to as a vehicle-in-the-loop simulation and/or a hardware-in-the-loop simulation. In such a hardware-in-the-loop simulation, in particular an embedded system of the test vehicle, for example, a control unit, is connected via its inputs and outputs to a corresponding simulation, which is used as a simulation of the real environment of the system. In a vehicle-in-the-loop [simulation], the complete test vehicle with its sensors and actuators is advantageously connected to a corresponding simulation of the real environment, for example, in a test stand. The same test situation vehicle network signals are preferably also fed into the SiL environment.

Subjecting the target hardware located in a test vehicle to the test situation thus includes operating the test environment according to the test situation, in particular activating a test stand using test situation activation signals and feeding test situation vehicle network signals into the vehicle data network of the vehicle. Subjecting the SiL environment to the test situation includes in particular feeding test situation vehicle network signals into the SiL environment. It is to be noted that the test situation vehicle network signals for the SiL environment also include further test situation vehicle network signals, which represent the result of the test stand activation, in addition to the test situation vehicle network signals for the vehicle data network. These include in particular all vehicle network signals linked to the vehicle movement such as GNSS/GPS position, velocity signals, acceleration signals, etc. In the case in which a test vehicle is tested on a test stand, some signals such as GNSS/GPS position, velocity, or acceleration are advantageously supplied from the simulation, while in contrast if the test vehicle is constructed on a suitable test open area, these signals are in particular fed in directly by the test vehicle sensors.

For example, a required signal generation of the test situation activation signals and/or test situation vehicle network signals may take place in the processing unit, in which the SiL environment is also implemented, for example, in the evaluation unit or simulation processing unit. The signal generation processing unit is preferably in a data-transferable manner connected to the target hardware, the SiL environment, and the test environment, for example, the test stand. This connection is preferably implemented via a real-time capable communication system, for example, such as FlexRay bus or so-called real-time ethernet, for example, based on the network protocols UDP (User Datagram Protocol) or TCP/IP (Transmission Control Protocol/Internet Protocol).

A test situation is preferably generated as a function of field data, which are collected using the target hardware. These field data are in particular collected in the field, i.e., in the real world under real conditions. In particular, vehicle network signals of one or multiple field vehicles, which are operated in the field, are recorded as these field data. The test vehicle may advantageously be operated itself, for example, as such a field vehicle for data collection. For example, field vehicles of the same type as the test vehicle may also be used as such field vehicles. The option is thus provided by the present invention of carrying out the evaluation of the software component on a test stand, but using real situations and therefore accompanying data.

At least one test situation is preferably generated from virtual driving profiles and/or test cases. Test cases advantageously describe the simulated, virtual environment in which the test vehicle is operated, for example, traffic or further road users, pedestrians, traffic signs, traffic lights, etc. Virtual driving profiles, in particular specified trips or routes in this simulated virtual environment, which the test vehicle and the SiL environment are to travel, for example, with the aid of velocity and steering angle profiles, inter alia. The virtual driving profiles are in particular adapted to the test cases or generated as a function of one another.

According to one particularly advantageous specific embodiment of the present invention, the virtual driving profiles and the test cases are predefined as a function of field data. The test cases and virtual driving profiles, which define the simulation environment of the test vehicle, are thus advantageously generated based on data collected in reality.

At a first point in time, these field data are advantageously collected in the field or in the real world. At a second point in time, which is after the first point in time with respect to time, one or multiple test situations are generated as a function of the collected field data, in particular with the aid of the virtual driving profiles and the test cases. Furthermore, a corresponding simulation of the field or the real world is advantageously generated based on these virtual driving profiles and test cases at the second point in time. At a third point in time, which is after the second point in time with respect to time, the target hardware and the SiL environment are subjected to the test situation.

The generation of a test situation for a vehicle advantageously includes one or multiple of the step(s) explained hereafter.

A first step includes the collection of field data in one or multiple field vehicles, which are operated in the field. These field vehicles may in particular be of the same type as the test vehicle. In particular, the field vehicles are each operated on a predefined route in a certain environment to collect the field data. It is possible, for example, to collect field data with the aid of a field vehicle which is operated multiple times on the same route in the field, for example, or with the aid of multiple vehicles which are operated once or multiple times on the same route in the field. The goal is to collect preferably many field data from different situations. The collected field data describe, on the one hand, in particular the surroundings and include, for example, road profiles, GPS coordinates, recognized traffic obstacles, pedestrians, other vehicles, traffic signs, traffic lights, etc. On the other hand, the field data in particular describe the travel carried out in the field itself and include, for example, velocity profiles.

In a second step, test data are advantageously extracted from the collected field data and processed. For example, raw sensor data are evaluated to be able to recognize the underlying traffic situations, for example, "pedestrian crosses road." Machine learning methods may be used for this purpose in particular.

In a further step, test cases are preferably generated as a function of the extracted test data according to predefined test criteria. For example, these predefined test criteria may require that certain driving maneuvers, traffic obstacles, traffic signs, etc. are to be encompassed.

Test cases may optionally be selected from all generated test cases. In particular, test cases are selected as critical test cases which use the software component to be rated. For example, if a software component is to be rated in conjunction with a pedestrian recognition, advantageously those test cases are selected for the test in which pedestrians are actually contained. Numerous test cases, prepared once for greatly varying requirements, may be stored for later use. During the later use, only special critical test cases are selected and tested. The test duration thus remains preferably short.

Furthermore, virtual driving profiles are advantageously also generated as a function of the extracted test data according to predefined driving criteria. In particular, the predefined route traveled in the field is used as a reference driving profile. GPS coordinates of the reference driving profile may advantageously be used to generate a basic framework for the virtual driving profiles. In particular, these predefined test conditions of the test cases, for example, the predefined driving maneuvers, may be correlated with this basic framework. The field data or the test data are advantageously searched as a function of the GPS coordinates of these correlated test conditions. The basic framework is thus advantageously filled with suitable field data.

The software component is preferably certified if the rating is good. The certification may advantageously be carried out with the aid of so-called blockchains. Certified software components may in particular be released for use in SiL environments.

An example processing unit according to the present invention, for example, an evaluation unit, is configured, in particular by programming, to carry out a method according to the present invention.

The implementation of a method according to the present invention in the form of a computer program or computer program product having program code for carrying out all method steps is also advantageous, since this causes particularly low costs, in particular if an executing control unit is still used for further tasks and is therefore present in any case. Suitable data carriers for providing the computer program are in particular magnetic, optical, and electrical memories, such as for example, hard drives, flash memories, EEPROMs, DVDs, etc. A download of a program via computer networks (Internet, intranet, etc.) is also possible ("software over the air" or "firmware over the air").

Further advantages and embodiments of the present invention result from the description herein and the figures.

The present invention is schematically illustrated on the basis of exemplary embodiments in the figures and is described hereafter with reference to the figures.

DETAILED DESCRIPTION OF EXAMPLE EMBODIMENTS

Figure 1:
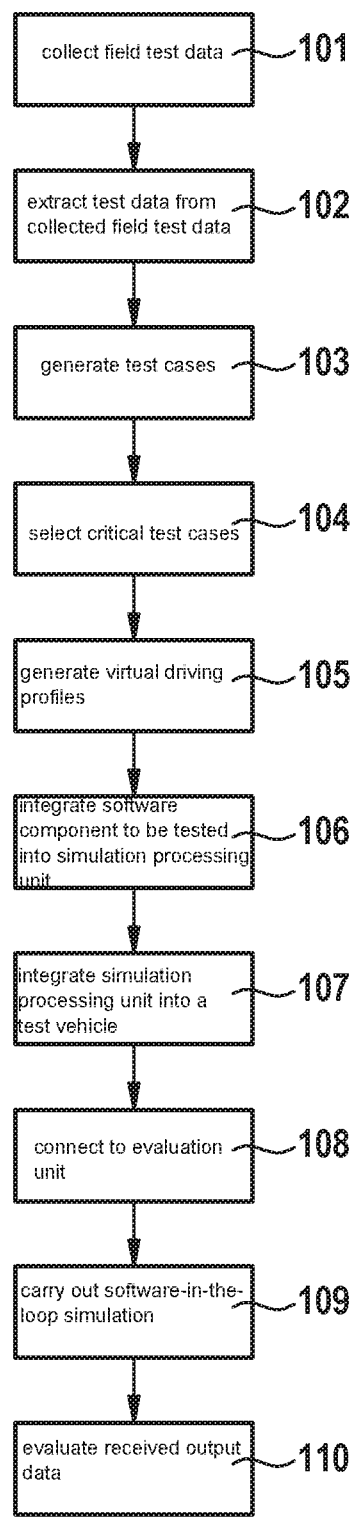
FIG. 1 schematically shows one preferred specific embodiment of the method according to the present invention as a block diagram.
Figure 2:
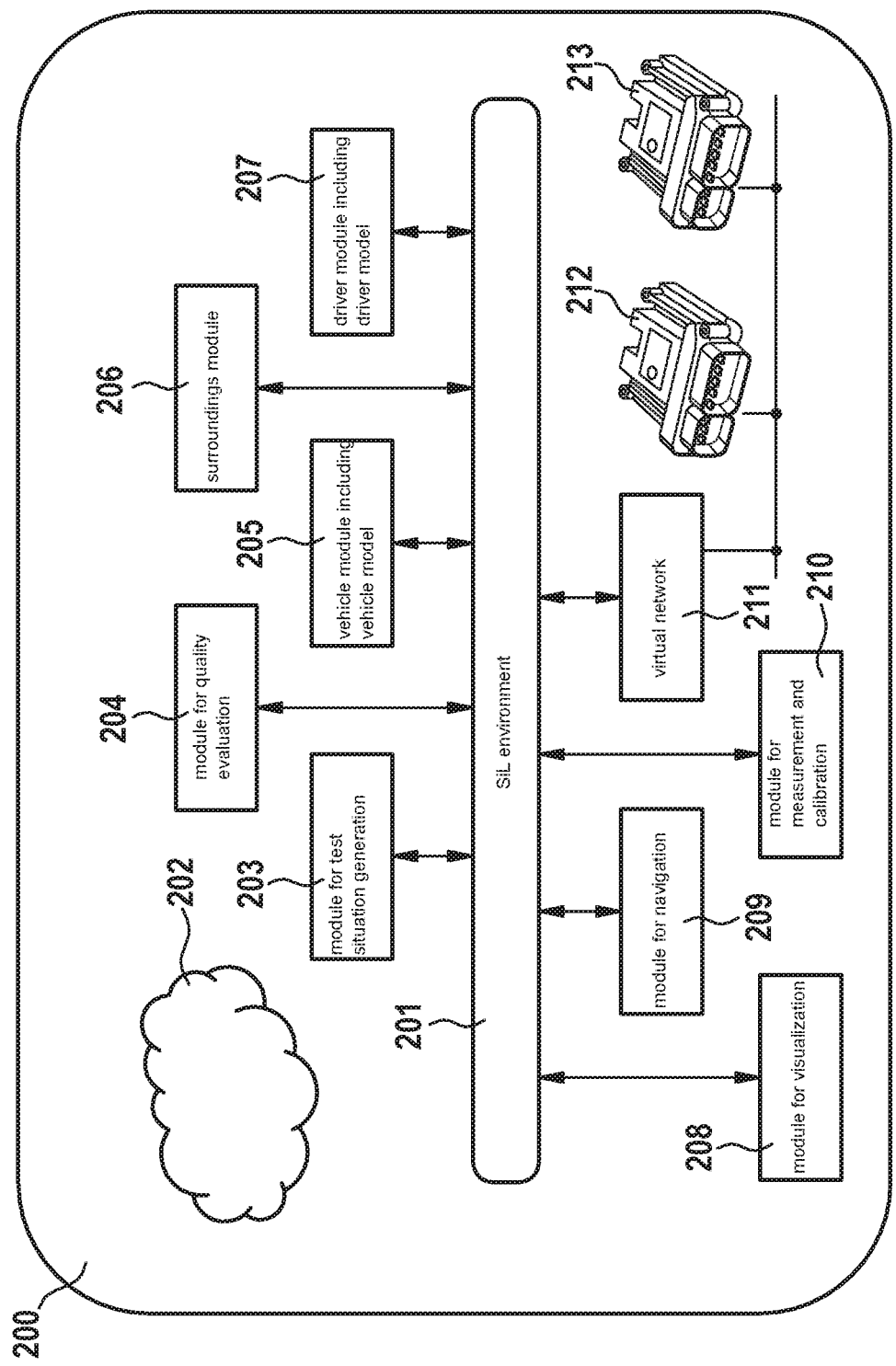
FIG. 2 schematically shows a simulation processing unit, which may be operated according to one preferred specific embodiment of the method according to the present invention.
Figure 3:
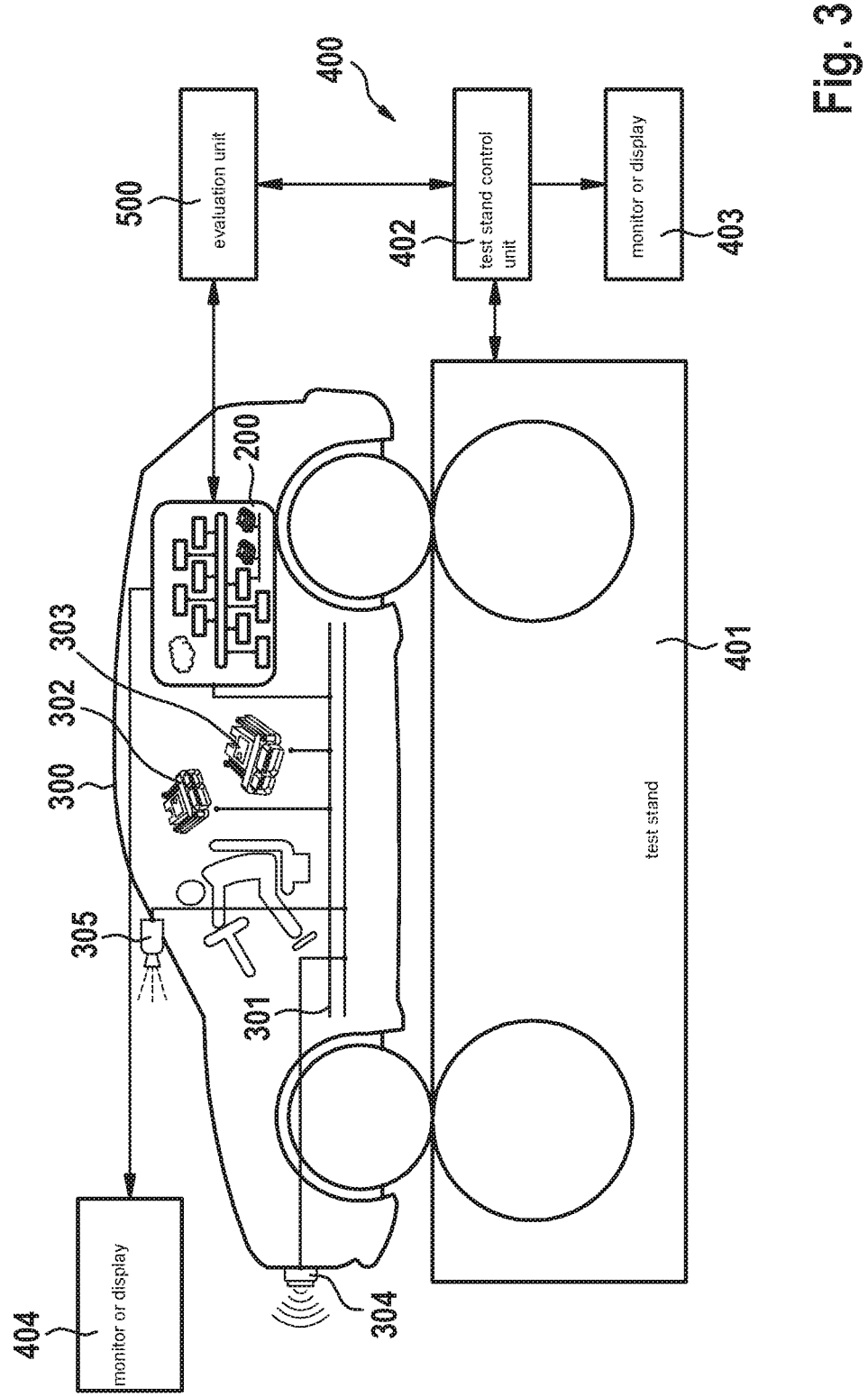
FIG. 3 schematically shows a test vehicle in a test environment, which may be operated according to one preferred specific embodiment of the method according to the present invention.

A method according to one preferred specific embodiment of the present invention is explained hereafter with reference to FIGS. 1 through 3. FIG. 1 schematically shows one preferred specific embodiment of a method according to the present invention as a block diagram. A simulation processing unit is schematically shown in FIG. 2 and a test vehicle in a test environment is schematically shown in FIG. 3, which may be operated according to one preferred specific embodiment of the method according to the present invention.

The case is considered by way of example hereafter that the software component is a simulation of a processing unit (for example, microcontroller) for recognizing pedestrians, which evaluates data from sensors of the vehicle, for example, from cameras, and carries out an object recognition to be able to recognize pedestrians located in the surroundings of the vehicle.

In the example shown, an (optional) data collection method, which is described in conjunction with steps 101 through 105, precedes the actual evaluation method, which is described in conjunction with steps 106 through 110. The data collected in this data collection method may also be provided in another manner in particular or may already be available.

In a step 101, field data of a test region are collected in at least one field vehicle, in particular in that vehicle network signals are recorded and stored on a vehicle data network (for example, CAN bus, FlexRay bus, etc.) of the field vehicle or directly at processing units (control units). The field data are generated, for example, by sensors such as cameras, radar, etc., by actuators such as accelerator pedal, steering wheel, etc., and by control units and describe, for example, road profiles, GPS coordinates, velocity profiles, recognized pedestrians, traffic obstacles, traffic signs, traffic lights, etc.

The field data are preferably collected multiple times on a predefined route. This means that at least the same field vehicle is operated multiple times on the route, or multiple field vehicles are each operated at least once on the route.

The test vehicle is advantageously used as the at least one field vehicle for data collection, or the field vehicle or vehicles are all of the same type as the test vehicle. The field data are thus compatible with the test vehicle.

By way of this step 101, a virtual map is obtained, which contains therein the data arising in the test vehicle for the test area, for example, the predefined route.

In a step 102, test data are extracted from the collected field data and processed. For example, raw sensor data are evaluated to be able to recognize the underlying traffic situations, for example, "pedestrian crosses road." Machine learning methods may be used for this purpose in particular.

In step 103, a variety of test cases are generated as a function of the extracted test data according to predefined test criteria. These test cases advantageously each describe a virtual environment, to which the software component to be tested may be subjected. The test criteria define (boundary) conditions which are supposed to be covered by the test. In particular, these test criteria predefine certain driving maneuvers, traffic obstacles, traffic signs, etc. The generation of the test cases may in particular take place automatically on the basis of these test criteria. For example, such a test criterion may include a situation in which a pedestrian crosses the road in front of the vehicle. Test data are then searched for in which pedestrians are located in the surroundings of the particular field vehicle and, for example, cross the road in front of the particular field vehicle. Therefore, (real) field data, which were recorded in step 102 by the sensors of the particular field vehicle, for example, cameras or radar sensors, and relate to a corresponding situation of a crossing pedestrian, may be used to rate the software component.

If the number of the generated test cases is excessively large, in a step 104, critical test cases may be selected from the variety of the generated test cases, which are then later actually tested to evaluate the software component. These test cases in particular include those which may be carried out both in the simulation and by a simulated test environment 400, which is explained hereafter. For example, driving maneuvers which are not reproducible on the test stand may be filtered out.

In a step 105, virtual driving profiles are furthermore generated using the extracted test data. These virtual driving profiles in particular predefine trips or routes which are to be retraced in the course of the later evaluation of the software component. The virtual driving profiles are in particular matched with the test cases or generated as a function of one another. Therefore, for example, these virtual driving profiles simulate trips in which pedestrians cross the road in front of the vehicle according to the test cases.

For example, GPS coordinates are initially predefined of routes traveled in step 101 by the vehicles as a reference driving profile to generate a basic framework or a data frame. This basic framework is gradually filled with test data to provide a virtual environment.

The test cases and virtual driving profiles represent predefined test situations to which target hardware and SiL environment are subjected. For example, trips are simulated in which pedestrians cross the road in front of the corresponding test vehicle. For the rating, output data generated by the software may be compared to output data of the target hardware.

In steps 106 through 108, the software-in-the-loop simulation is prepared and corresponding simulation hardware is configured.

In step 106, the software component to be tested is integrated into a simulation processing unit. Such a simulation processing unit is schematically shown in FIG. 2 and identified by reference numeral 200.

An SiL environment is identified by reference numeral 201. SiL environment 201 contains in particular the software component to be evaluated.

The software or the simulation processing unit may be connected via this environment to a remote processing unit 202, for example, to a server.

The simulation processing unit includes multiple components or modules, for example, a module for test situation generation 203 and for quality evaluation 204 and a vehicle module 205 including a vehicle model, a surroundings module 206 including a surroundings model, and a driver module 207 including a driver model. Furthermore, modules may be provided for visualization 208, navigation 209, and measurement and calibration 210. Virtual control units 212 and 213 may be simulated via a virtual network 211. In particular, by way of these individual components or modules 201 through 213, further components may be incorporated into the overall simulation which are not provided in the test vehicle, for example, a virtual parking control unit or an electrical brake booster (iBooster).

In step 107, simulation processing unit 200 is integrated into a test vehicle and connected to target hardware of the test vehicle and the test vehicle is integrated into a simulated test environment.

In step 108, the simulation processing unit and components of the test vehicle are data-transferably connected to an evaluation unit.

Such a test vehicle 300, such a test environment 400, and such an evaluation unit 500 are schematically shown in FIG. 3.

Test vehicle 300 includes a vehicle data network 301 (for example, CAN, FlexRay, or Ethernet), to which, for example, control units 302, 303 and sensors such as a radar unit 304 and a camera unit 305 are connected. It is obvious that still further components may be connected to vehicle data network 301, for example, further control units, sensors, actuators, etc. Furthermore, simulation processing unit 200 is connected to the vehicle data network.

For example, recognition software may be designed in control unit 302, which evaluates sensor data of camera unit 305 to recognize pedestrians. These sensor data are provided to control unit 302 on the basis of the test scenarios of simulation processing unit 200 as test situation vehicle network signals, by feeding them into vehicle data network 301. In parallel thereto, the sensor data are also provided to SiL environment 201.

The test environment of test vehicle 300 is identified by reference numeral 400 and includes a test stand 401 and a test stand control unit 402 for controlling test stand 401. Furthermore, monitors or displays 403 and 404 are provided. For example, test stand control unit 402 is connected to test stand 401 based on the protocol TCP/IP (Transmission Control Protocol/Internet Protocol). A connection to the displays 403, 404 may be established via an interface according to the 'Digital Visual Interface' (DVI).

Test stand control unit 402 is in particular activated according to the virtual driving profiles, in particular by receiving test situation vehicle network signals from simulation processing unit 200 or evaluation unit 500. Testing control unit 402 may activate test stand 401 and displays 403 and 404 in such a way that a trip of test vehicle 300 may be simulated according to the virtual driving profiles.

Test environment 400 in particular represents a vehicle-in-the-loop simulation for test vehicle 300. The surroundings of test vehicle 300 may be simulated preferably detailed by test environment 400.

Alternatively, test environment 400 may preferably also include a suitable test open area, on which test vehicle 300 may move freely. In the case of the use of a suitable test open area as test environment 400, only the activation of test stand 401 is advantageously dispensed with in testing control unit 402, the activation of displays 403, 404 accordingly remains.

With the aid of this test environment 400, for example, a trip of test vehicle 300 is simulated according to the virtual driving profiles, in which pedestrians cross the road. Corresponding signals of camera unit 305 or radar unit 304 are supplied by simulation processing unit 200 as test situation vehicle network signals into the vehicle data network of the test vehicle. Control unit 302 will generate corresponding output signals on the basis thereof.

Images or videos may be displayed to a driver, for example, on monitor 404, which were recorded in step 101 as field data in a particular field vehicle.

Evaluation unit 500 is designed as a real-time capable processing unit and has a data-transferable connection via real-time capable communication systems to simulation processing unit 200, components of test vehicle 300, and test stand control unit 402. For example, a connection between evaluation unit 500 and simulation processing unit 200 and components of test vehicle 300 may be based on the protocol UDP (User Datagram Protocol). A connection between evaluation unit 500 and test stand control unit 402 may also be based on UDP, for example.

When the test structure shown in FIG. 3 is prepared according to steps 106 through 108, the software-in-the-loop simulation is carried out in step 109.

With the aid of test environment 400, corresponding trips of test vehicle 300 are simulated in a simulated virtual environment, i.e., the target hardware is subjected to a test situation.

SiL environment 201 is also subjected to the test situation at the same time. If a real-time capable operation is necessary for this purpose, SiL environment 201 may be implemented in real-time capable evaluation unit 500. In particular, simulation processing unit 200 and evaluation unit 500 may also be implemented in the same processing unit.

In the course of the simulation, data, for example, measured values, activation data for actuators, etc., are generated by simulation processing unit 200 or the executed software component and by the target hardware component of test vehicle 300. These data are received by evaluation unit 500 during the procedure and evaluated immediately, in particular in real time or during and as long as the target hardware and the SiL environment are subjected to the test situation. Furthermore, evaluation unit 500 or simulation processing unit 200 activates test stand control unit 402 with the aid of the test situation activation signals.

In step 110, evaluation unit 500 evaluates these received output data and evaluates the carried out software component in real time and online during the test run. For this purpose, an algorithm or an evaluation algorithm is carried out in evaluation unit 500. In particular, the received output data are compared to one another and individual software components are evaluated, in particular qualitatively, as a function thereof. Components, whose rating is in a predefined range, are certified by evaluation unit 500 and released for regular operation.

Evaluation unit 500 compares the output data from simulation processing unit 200, i.e., the result of the SiL, to the output data from test vehicle 300. The output data or the results are supposed to be identical in the ideal case. In contrast, if the output data are not identical below a tolerance threshold, this indicates in particular that the software component simulates the target hardware component inadequately and the software component may not yet be released.

Therefore, an automated evaluation of the software component to be tested online during the software-in-the-loop simulation is enabled in real-time by the present method.

What is claimed is:

1. A method for testing a software in development using a software-in-the-loop (SiL) environment, the method comprising:
    rating a suitability of a simulation software component to be a part of the SiL environment by the simulation software component simulating functioning of a corresponding target hardware component of a target hardware, the rating of the suitability being performed by:
        simulating, by the SiL environment including the simulation software component, the target hardware, the simulating including the simulation software component simulating the functioning of the target hardware component;
        subjecting both the target hardware and the SiL environment, including the simulation software component, to a test situation, wherein, due to the inclusion of the simulation software component in the SiL environment, the subjecting thereby subjects the simulation software component to the test situation;
        while the target hardware and the SiL environment are subjected to the test situation, generating output data by both the target hardware and the SiL environment, the output data being generated at least in part by the simulation software component simulating the corresponding target hardware component processing the test situation, thereby producing a corresponding output; and
        comparing the output data of the target hardware to the output data of the SiL environment, wherein the suitability of the simulation software component to be included in the SiL environment for testing the software in development is ascertained according to a result of the comparison; and
    based on the simulation software component being certified, by the rating, as being suitable for the SiL environment, testing the software in development using the simulation software component integrated in the SiL environment so that the simulation software component thereby simulates the functioning of the corresponding target hardware component to process inputs provided by the testing of the software in development.

2. The method as recited in claim 1, wherein the target hardware and SiL environment are supplied a same set of signals, while the target hardware and the SiL environment are subjected to the test situation.

3. The method as recited in claim 1, wherein the target hardware is located in a vehicle.

4. The method as recited in claim 3, wherein the vehicle is operated in a predefined test environment in a test stand or a test open area, while the target hardware and the SiL environment are subjected to the test situation.

5. The method as recited in claim 3, wherein the target hardware is subjected to the test situation by activating a test stand using test situation activation signals and feeding test situation vehicle network signals into a vehicle data network of the vehicle.

6. The method as recited in claim 3, wherein the SiL environment is subjected to the test situation by feeding test situation vehicle network signals into the SiL environment.

7. The method as recited in claim 1, wherein the test situation is generated as a function of field data which are collected using the target hardware.

8. An arrangement, comprising:
    target hardware including at least one target hardware component;
    a software-in-the-loop (SiL) environment including a simulation software component; and
    a hardware processor;
    wherein the hardware processor is configured to:
        rate a suitability of the simulation software component to be a part of the SiL environment by the simulation software component simulating functioning of a corresponding target hardware component of a target hardware, the rating of the suitability being performed by:
            causing the SiL environment, including the simulation software component, to simulate the target hardware, the simulation including the simulation software component simulating the functioning of the target hardware component;
            subjecting both the target hardware and the SiL environment, including the simulation software component, to a test situation, wherein, due to the inclusion of the simulation software component in the SiL environment, the subjecting thereby subjects the simulation software component to the test situation, the target hardware and the SiL environment both generating output data while the target hardware and the SiL environment are subjected to the test situation, wherein the output data is generated at least in part by the simulation software component simulating the corresponding target hardware component processing the test situation, thereby producing a corresponding output;
            comparing the output data of the target hardware to the output data of the SiL environment, the suitability of the simulation software component to be included in the SiL environment for testing the software in development being ascertained according to a result of the comparison; and
        based on the simulation software component being certified, by the rating, as being suitable for the SiL environment, deploying the SiL environment to test the software in development using the simulation software component integrated in the SiL environment so that the simulation software component thereby simulates the functioning of the corresponding target hardware component to process inputs provided by the testing of the software in development.

9. A non-transitory machine-readable storage medium on which is stored a computer program for testing a software in development using a software-in-the-loop (SiL) environment, the computer program, when executed by a computer, causing the computer to perform a method, the method comprising:

rating a suitability of a simulation software component to be a part of the SiL environment by the simulation software component simulating functioning of a corresponding target hardware component of a target hardware, the rating of the suitability being performed by:
  simulating, by the SiL environment including the simulation software component, the target hardware, the simulating including the simulation software component simulating the functioning of the target hardware component;
  subjecting both the target hardware and the SiL environment, including the simulation software component, to a test situation, wherein, due to the inclusion of the simulation software component in the SiL environment, the subjecting thereby subjects the simulation software component to the test situation;
  while the target hardware and the SiL environment are subjected to the test situation, generating output data by both the target hardware and the SiL environment, the output data being generated at least in part by the simulation software component simulating the corresponding target hardware component processing the test situation, thereby producing a corresponding output; and
  comparing the output data of the target hardware to the output data of the SiL environment, wherein the suitability of the simulation software component to be included in the SiL environment for testing the software in development is ascertained according to a result of the comparison; and
based on the simulation software component being certified, by the rating, as being suitable for the SiL environment, testing the software in development using the simulation software component integrated in the SiL environment so that the simulation software component thereby simulates the functioning of the corresponding target hardware component to process inputs provided by the testing of the software in development.

\* \* \* \* \*